(12) United States Patent
Massault et al.

(10) Patent No.: US 9,335,021 B2
(45) Date of Patent: May 10, 2016

(54) MOTOR VEHICLE WITH TURN SIGNAL REPEATER GLAZING

(71) Applicant: SAINT-GOBAIN GLASS FRANCE, Courbevoie (FR)

(72) Inventors: Laetitia Massault, Magny les Compiegne (FR); Adele Verrat-Debailleul, Villers-sur-Coudun (FR); Pascal Bauerle, Roye (FR); Sophie Milhe Poutingon, Senlis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 108 days.

(21) Appl. No.: 14/351,991

(22) PCT Filed: Oct. 31, 2012

(86) PCT No.: PCT/FR2012/052525
§ 371 (c)(1),
(2) Date: Apr. 15, 2014

(87) PCT Pub. No.: WO2013/068679
PCT Pub. Date: May 16, 2013

(65) Prior Publication Data
US 2014/0254187 A1    Sep. 11, 2014

(30) Foreign Application Priority Data

Nov. 7, 2011   (FR) ..................................... 11 60054

(51) Int. Cl.
*B60Q 1/26*        (2006.01)
*F21S 8/10*        (2006.01)
(Continued)

(52) U.S. Cl.
CPC ....... *F21S 48/2243* (2013.01); *B32B 17/10036* (2013.01); *B32B 17/10348* (2013.01);
(Continued)

(58) Field of Classification Search
CPC ........ B60Q 1/34; B60Q 1/268; B60Q 3/0213; F21S 48/20
USPC ......................................................... 362/503
See application file for complete search history.

(56) References Cited

U.S. PATENT DOCUMENTS 4,933,823 A * 6/1990 Taylor ..................... F21V 7/22
                                                   359/884
6,672,748 B2 * 1/2004 Baldwin ................. G09F 13/00
                                                   362/222
(Continued)

FOREIGN PATENT DOCUMENTS

DE    10 2008 004 049 A1    7/2009
EP        1 234 752 A1      8/2002
(Continued)

OTHER PUBLICATIONS

International Search Report issued Dec. 21, 2012, in PCT/FR12/052525 filed Oct. 31, 2012.
(Continued)

*Primary Examiner* — Robert May
*Assistant Examiner* — Bryon T Gyllstrom
(74) *Attorney, Agent, or Firm* — Oblon, McClelland, Maier & Neustadt, L.L.P

(57) ABSTRACT

An automobile vehicle including at least one glazing unit capable of operating as a direction indicator light, the glazing unit including: a first transparent sheet including first and second main faces, and an edge face; one or more light sources, each including a light-emission face opposite the edge face, connected to emit a flashing light synchronized with flashing of other direction indicator lights of the vehicle; a mechanism for extraction of light in at least one region of the first main face or the second main face of the first sheet or situated in a thickness of the first sheet, the extraction mechanism emitting, when illuminated by the light sources, an auto yellow light; and a mechanism rendering opaque situated toward inside of the vehicle with respect to the extraction mechanism and totally masking the extraction mechanism to render the extraction mechanism invisible from the inside of the vehicle.

15 Claims, 2 Drawing Sheets

Figure 1:
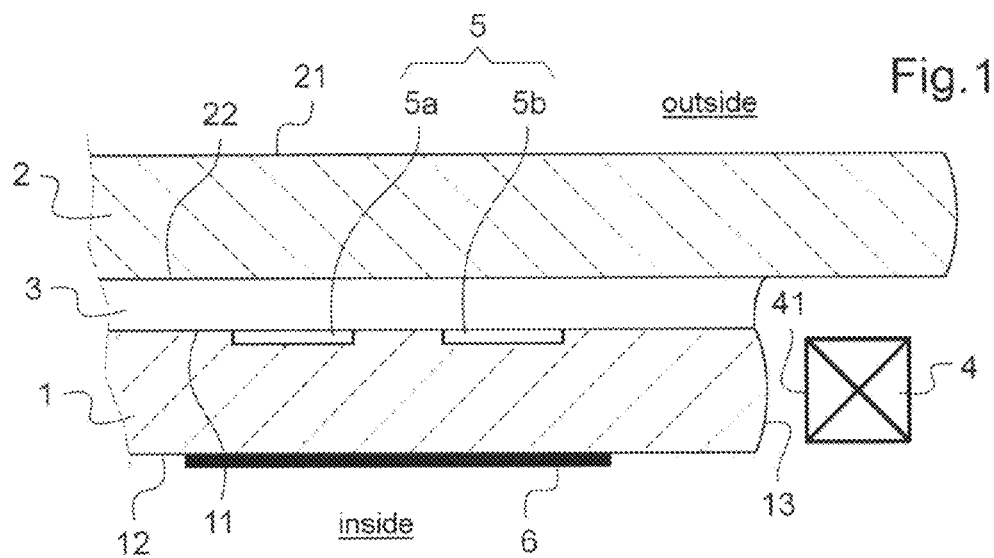

(51) Int. Cl.
  *B32B 17/10* (2006.01)
  *B60J 1/10* (2006.01)
  *B60Q 1/38* (2006.01)
  *F21V 8/00* (2006.01)

(52) U.S. Cl.
  CPC ............ *B32B17/10541* (2013.01); *B60J 1/10* (2013.01); *B60Q 1/268* (2013.01); *B60Q 1/38* (2013.01); *G02B 6/0033* (2013.01)

(56) References Cited

U.S. PATENT DOCUMENTS

| | | | | |
|---|---|---|---|---|
| 7,048,422 B1 * | 5/2006 | Solomon | ................ | B60Q 1/268 345/76 |
| 8,314,902 B2 * | 11/2012 | Kim | ................ | G02F 1/13362 349/62 |
| 2002/0135208 A1 | 9/2002 | Pommeret et al. | | |
| 2004/0105274 A1 | 6/2004 | Pommeret et al. | | |
| 2006/0209551 A1 * | 9/2006 | Schwenke | ............ | B32B 27/08 362/503 |
| 2006/0221642 A1 * | 10/2006 | Daiku | ................ | G02B 6/0058 362/626 |
| 2007/0053208 A1 * | 3/2007 | Justel | .................... | C09K 11/02 362/629 |
| 2008/0002427 A1 * | 1/2008 | Kropac | .................... | B60Q 1/26 362/606 |
| 2010/0265731 A1 * | 10/2010 | Van Herpen | ............. | B60Q 1/52 362/543 |
| 2012/0162269 A1 * | 6/2012 | Bohn | ................ | G02B 26/005 345/690 |
| 2012/0163021 A1 * | 6/2012 | Bohn | ................ | G02F 1/133615 362/608 |
| 2013/0301300 A1 * | 11/2013 | Duerksen | ............. | G02B 6/0095 362/627 |

FOREIGN PATENT DOCUMENTS

FR  2 948 609  2/2011
WO  WO 2004/082934 A1  9/2004

OTHER PUBLICATIONS

U.S. Appl. No. 14/352,545, filed Apr. 17, 2014, Massault, et al.

\* cited by examiner

MOTOR VEHICLE WITH TURN SIGNAL REPEATER GLAZING

The present invention relates to an automobile vehicle with a side glazing unit fulfilling the function of an indicator light flasher.

In the field of automobile vehicles, doubling up certain signaling lights, such as the rear lights, direction indicator lights, stop lights or reversing lights, with light sources that are synchronized with these signaling lights and have the same color as the latter is a known technique. These light sources may be placed on the vehicle body or else inside the passenger compartment. In the case of an indicator light flasher, this may also be incorporated into the wing mirror of the vehicle.

Such a doubling up of a part of the signaling lights involves one or more additional parts to be managed in the production line and consequently increases the costs of production. Furthermore, these additional, "displaced" signaling lights are not always totally satisfactory from an aesthetic point of view.

The present invention is based on the idea of incorporating the function of an indicator light flasher directly into a side glazing unit of the vehicle, preferably in the front fixed lateral windows of the vehicle.

Such an incorporation of additional flashing light sources in the windows of a car, however, poses serious road safety problems.

This is because the light emitted by the direction indicator lights (indicators and indicator flashers) must only be visible from the side where the direction indicator light in question is situated. If light were emitted by windows toward the inside of the vehicle, there would be a risk of it being visible, by transparency, on the outside of the latter. The flashing of the left indicator light flasher, for example, could then be interpreted, in certain situations, by the driver of another vehicle, as coming from the right side, and vice versa.

It will also be understood that the visibility, by the driver, of the direction indicator lights of his own car could be very distracting in certain situations, notably while driving at night or when this light is reflected on windows or other reflecting surfaces inside of the vehicle.

In order to be certified, such an indicator flasher glazing unit must therefore comprise masking elements preventing the light from penetrating into the interior of the passenger compartment, preferably without excessively or undesirably reducing the glass clarity.

The present application provides a vehicle with an indicator light flasher in the form of a side window, where these technical and safety objectives have been achieved thanks to relatively simple and low-cost technical means which are very satisfactory from an aesthetic point of view.

One subject of the present application is accordingly an automobile vehicle comprising at least one side glazing unit capable of operating as a direction indicator light of the vehicle, said glazing unit comprising

- a first transparent sheet, made of mineral or organic glass, with a first main face directed towards the outside of the vehicle, a second main face directed toward the inside of the vehicle, and an edge face,
- one or more light sources, preferably light-emitting diodes (LED), each having a light-emission face opposite the edge face, the light emitted by the light sources thus being guided in the first sheet between the first and the second main face of the latter, the light sources being connected in such a manner as to enable the emission of a flashing light, synchronized with the flashing of the other direction indicator lights of the vehicle,
- a means for extraction of the light in at least one region of the first main face or of the second main face of the first sheet or situated within the thickness of the first sheet, said extraction means emitting, when it is illuminated by the light sources, an auto yellow light, and
- a means for rendering opaque situated toward the inside of the vehicle with respect to the means for extraction of the light and totally masking the means for extraction of the light in such a manner as to render it invisible from the inside of the vehicle.

The glazing unit of the automobile vehicle of the present invention can be a single-piece glazing unit or a laminated glazing unit comprising at least two single sheets bonded together in a known manner by means of a sheet separating interface. It is important to note that, in the description hereinafter of the glazing unit, the term "first sheet" will always denote the sheet of glass illuminated on its edge face by the light source or sources, independently of its position with respect to the second sheet. In other words, the first sheet ("illuminated" sheet) can be that in contact with the outside or with the inside of the vehicle, and can be doubled up by a second sheet on its face respectively oriented toward the inside or toward the outside of the vehicle.

Of course, when the glazing unit is a single-piece glazing unit, the "first sheet" is the one and only glass sheet of the glazing unit.

When the glazing unit is a laminated glazing unit, it comprises, in addition to the first sheet, a second transparent sheet, also made of organic or mineral glass, with a first main face directed toward the outside of the vehicle, and a second main face directed toward the inside of the vehicle, said second sheet being fixed to the first sheet by means of a transparent sheet separating interface. This sheet separating interface is in adhesive contact (a) either with the second main face of the first sheet and the first main face of the second sheet, (b) or with the first main face of the first sheet and the second main face of the second sheet.

In the variant (a), the sheet illuminated by its edge face (first sheet) is the sheet in contact with the outside air. This variant offers the advantage of a good illumination efficiency for the glazing unit because the light emitted toward the outside will not be absorbed at all by the separation interface or the second sheet. It does however have the drawback that scratches or dirt, which could be present on the first main face of the first sheet (external face of the glazing unit), will be highly visible when they are illuminated by the LED situated on the edge face of the first sheet.

It is for this reason that the variant (b), corresponding to the embodiment where the illuminated sheet is that which is in contact with the air of the passenger compartment of the vehicle, will generally be preferred with respect to the variant (a), despite a potential reduction in the illumination efficiency. In this preferred embodiment, the second sheet is fixed to the first sheet by means of the sheet separating interface which is in adhesive contact with the first main face of the first sheet and the second main face of the second sheet, and the means for extraction of the light is preferably on the first main face of the first sheet and the means for rendering opaque on the second main face of the first sheet.

The first and second sheets can be made of organic glass, for example polycarbonate, polyurethane, poly(methylmethacrylate) or polyolefines. Sheets of organic glass typically have a thickness in the range between 1 and 6 mm.

A mineral glass will however preferably be used for single-piece glazing units, in particular a dip-coated glass.

The first sheet will preferably be made of colorless soda-lime mineral glass such as the glass Planilux® marketed by the applicant. It typically has a thickness in the range between 2.5 and 6 mm when used as a single-piece glazing unit, and a thickness in the range between 1.4 and 3.2, preferably between 1.4 and 2.1 mm, when used for a laminated glazing unit.

When the second sheet is bonded onto the external face of the first sheet, it is preferably as transparent and colorless as the first sheet. In one preferred embodiment, a laminated glazing unit according to the invention will be composed of two colorless Planilux® sheets, joined together by means of a tinted sheet separating interface.

When it is bonded onto the internal face of the first sheet, it can, on the contrary, be made of tinted glass, for example the glass Venus®, TSA3+ or TSA4+ also marketed by the applicant. Although the laminating of two sheets with different tints poses, at the present time, various drawbacks associated with the glass fabrication process, this embodiment could become particularly advantageous when these problems have been overcome.

The second sheet typically has a thickness in the range between 1.4 and 2.1 mm.

The separation interface can be composed of any kind of polymer material commonly used for this function. By way of example for such materials, the following may be mentioned: poly(vinylbutyral) (PVB), plastified polyurethane and co-polymers of ethylene and vinylacetate (EVA), potentially partially hydrolyzed. It typically has a thickness in the range between 0.2 and 1.1 mm and may be colorless or tinted.

The light emitted by the light sources enters via the edge face of the first sheet which acts as a waveguide. In order to "extract" the light from this waveguide, numerous extraction means exist that are well known to those skilled in the art and widely used in the field of glazing.

The means for extraction of the light may, for example, be a roughened area of the first sheet or else a diffusive coating applied to one of the main faces of the first sheet or else to the face of the sheet separating interface in contact with the first sheet. The means could also be a region etched into the thickness of the first sheet or else scattering elements, such as particles or glass fibers, incorporated into the separation interface.

As diffusive coating, any diffusive coating commonly used in the field of glazing may be used. Such a coating generally comprises particles having a size of the order of a micrometer and an organic or mineral binder allowing these particles to adhere to the surface of the glass. The particles can be made of metal or a metal oxide. Their average size is typically in the range between 50 nm and 1 micrometer. A suitable diffusive coating is described for example in the international application WO 01/90787.

The means for rendering opaque may be any given means allowing a screen or an opaque barrier to be interposed between the means for extraction of the light and the interior of the vehicle. This may be a plaque or a film of plastic material, bonded onto the inside face of the glazing unit. In one preferred embodiment of the invention, the means for rendering opaque is an opaque layer, formed from enamel or ink, which is in contact with at least one of the main faces of the sheet or of one of the sheets of the glazing unit. This opaque layer may be deposited onto one of the main faces of the sheets, but also onto one of the faces of the sheet separating interface.

In one embodiment of the present invention, the masking opaque layer is made of enamel. Those skilled in the art are familiar with the application of opaque enamels, generally with a black color, around the edges of automobile glazing units.

For the fabrication of two congruent layers, one having a clear color (means for extraction of the light) and the other having a darker color, potentially black (opaque layer), reference may be made to the application US2006/0150680. The application EP0636588 describes the fabrication of metalized enamels which, due to their reflective nature, can be particularly advantageous for the present invention.

In another embodiment of the glazing unit of the present invention, the opaque masking layer is composed of ink. Since this ink does not generally need to be subjected to temperatures as high as the enamel, the use of an ink allows additional application possibilities. Indeed, the ink may be applied by printing, for example by serigraphy, on one of the main faces of the first or of the second sheet, but it may also be applied on one of the faces of the sheet separating interface which will, after assembly, be in direct contact with one of the main faces of the sheets of glass.

Black inks for printing on glass are known to those skilled in the art. Printing on the sheet separating interface with black inks is described for example in the French application filed by the applicant on the 12 Apr. 2011 under the number 11 53189.

Various configurations for the means for extraction of the light and the means for rendering opaque may be envisioned. These two elements, essential for the invention, may be in contact with each other, or else they can be separated for example by one of the sheets of glass and/or by the sheet separating interface. In any case, the opaque masking layer is of course situated more toward the inside of the vehicle than the extraction means; otherwise it would not be able to fulfill the role of being a screen for the light.

Figure 2:
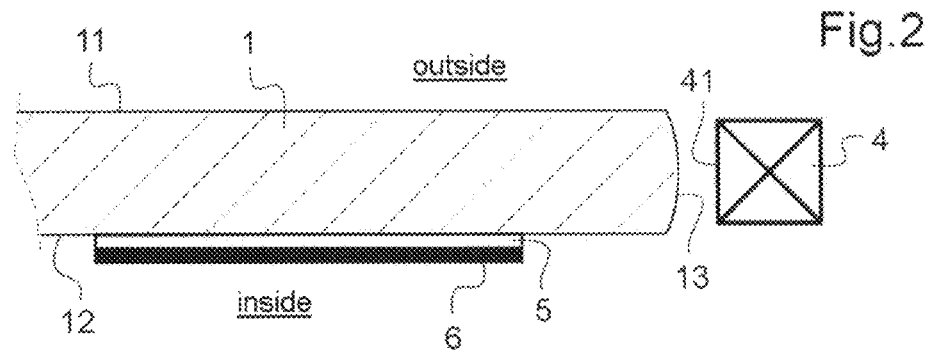

In one embodiment, shown in FIG. 2, the means for extraction of the light is on the second main face of the first sheet, and the means for rendering opaque is directly in contact with the means for extraction of the light and completely covers it.

The means for rendering opaque can have the same size and shape as the extraction means and may be perfectly superimposed on the latter, or else it may be larger than the latter and overlap the limit thereof. In one preferred embodiment, the two layers (extraction means and means for rendering opaque) are deposited on top of each other on the second main face of the first sheet.

The deposition may however also be envisioned of the means for extraction of the light onto the second face of the first sheet and the deposition of an opaque ink (means for rendering opaque) onto at least one of the faces of a sheet separating interface, where present, which will subsequently be brought into contact with the first sheet in such a manner that these two depositions are superposed.

In a second embodiment of the glazing unit of the present invention, shown in FIG. 1, the means for extraction of the light is on the first main face of the first sheet and the means for rendering opaque is on the second main face of the first sheet. In this embodiment where the opaque layer is not directly in contact with the means for extraction of the light, the offset between these two layers (thickness of the first sheet) risks reducing the effectiveness of masking of the light by the opaque layer. In this embodiment, it is consequently particularly advantageous for the extent of the opaque layer to be greater than that of the extraction means and to overlap the latter around its whole periphery.

Figure 3:
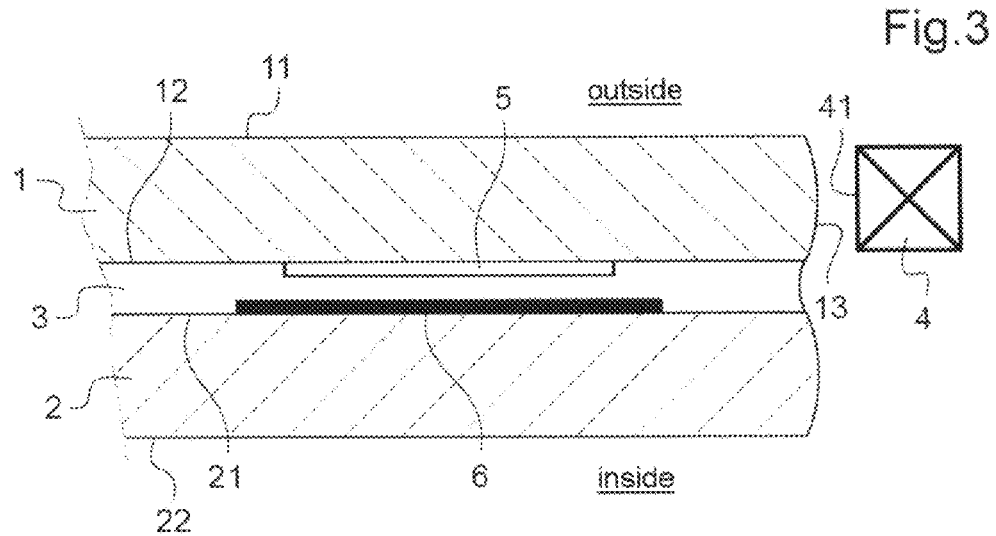

A further embodiment of the glazing unit of the present invention, shown in FIG. 3, only relates to laminated glazing units. In this embodiment, the illuminated sheet (=first sheet)

is the sheet in contact with the outside air, in other words the second sheet is fixed to the first sheet by means of the sheet separating interface which is in adhesive contact with the second face of the first sheet and the first main face of the second sheet, and the means for extraction of the light is on at least one of the main faces of the first sheet and the means for rendering opaque on at least one of the main faces of the second sheet. As for the embodiment shown in FIG. 1, it is particularly advantageous here for the extent of the layer for rendering opaque to be greater than that of the extraction means and to overlap the latter around its whole periphery.

Lastly, a final advantageous embodiment is characterized in that the second sheet is fixed to the first sheet by means of the sheet separating interface which is in adhesive contact with the first main face of the first sheet and the second main face of the second sheet, and the means for extraction of the light is on the first main face of the first sheet and the means for rendering opaque on the second main face of this first sheet.

The means for extraction of the light can take the form of a single continuous region, with any given shape, or else it may be applied over several separate regions of the first or second main face of the first sheet. The same is of course true for the means for rendering opaque which may be a single region or be composed of several separate regions. When the extraction means is present in the form of several separate regions, the means for rendering opaque can be a single region surrounding all of these regions, as illustrated in FIG. 1.

As explained hereinabove, when the means for rendering opaque is not directly in contact with the extraction means, it preferably has a greater extent than the latter. Generally speaking, the total extent of the region or regions covered by the means for rendering opaque is greater by at least 5%, preferably by at least 10% and in particular by at least 20%, than the total extent of the region or regions covered by the means for extraction of the light.

On the other hand, when these two layers are in contact with each other, they can be congruent (in other words of the same shape and size) and superposed one on top of the other.

It may, in principle, perfectly well be envisioned for the whole surface area of the indicator light flasher glazing unit to be covered by an opaque layer, of course with the proviso that the glazing unit does not obscure the view of the driver with one of the wing mirrors. However, in one preferred embodiment, the glazing unit comprises at least one transparent region, known as "window clear-view", not covered by the opaque layer.

This window clear-view generally represents at least 20%, preferably at least 50% and in particular at least 70%, of the total surface area of the glazing unit, including the regions covered by the encapsulation or the joints. In other words, the opaque layer covers a region that generally represents at the most 80%, preferably at the most 50% and in particular at the most 30% of the total surface area of the glazing unit.

As was mentioned hereinbefore, the enamel and the ink forming the means for rendering opaque can be both reflective and opaque. When they are not reflective and absorb the majority of the light, it may be advantageous, for obvious reasons of illumination efficiency, to interpose a reflecting layer, preferably a thin metal layer, between the means for extraction of the light and the means for rendering opaque.

"Opaque layer", in the present application, is understood to mean a layer having an optical density equal to at least 2. The optical density of the opaque layer is preferably in the range between 2.5 and 5, more preferably between 2.8 and 4.5 and, in particular, between 3 and 4.

When the opaque layer is doubled up, on its face turned toward the means for extraction of the light, by a reflecting layer, for example by a thin metal layer, it suffices for the assembly of these two layers to have the optical densities hereinabove.

The indicator light flasher glazing unit according to the invention emits a light with an auto yellow color (see Council Directive no 76/759/CEE of the 27 Jun. 1976, Appendix V). It is situated on a side window (category 5 direction indicator light), preferably on a fixed side window such as the deflector or the quarter-light, in particular on a front fixed side glazing unit (quarter-light).

The auto yellow color of the light emitted by the glazing unit, and more precisely by the means for extraction of the light, may be obtained, amongst other ways, using
light sources emitting an auto yellow light,
a tinted first sheet (waveguide for the light received from the light sources),
a tinted sheet separating interface in adhesive contact with the first face of the first sheet, or
a means for extraction of light with a yellow, orange or auto yellow color.

By way of example, for preferred embodiments, the following may be mentioned:
a LED with an auto yellow color in combination with a first untinted sheet and a white extraction material;
a LED with an auto yellow color in combination with a first untinted sheet and an orange or yellow extraction material;
a LED with a white color in combination with a first untinted sheet and an orange or yellow extraction material.

The use of a LED emitting UV radiation may also be envisioned in combination with an extraction material of the fluorescent luminophore type.

The light sources will of course require an electrical power supply system, either stand-alone or attached to the electrical system of the car. The light sources will furthermore need to be configured in such a manner as to be able to receive control signals switching them on/off.

In order to guarantee a satisfactory illumination power, in the range between 0.3 and 200 cd seen from an angle in the range between 5 and 55° with respect to the reference axis of the vehicle (see directive no 76/759/CEE), the emission faces of the light sources are preferably opposite the edge face of the first sheet positioned toward the front of the vehicle.

Figure 4A:
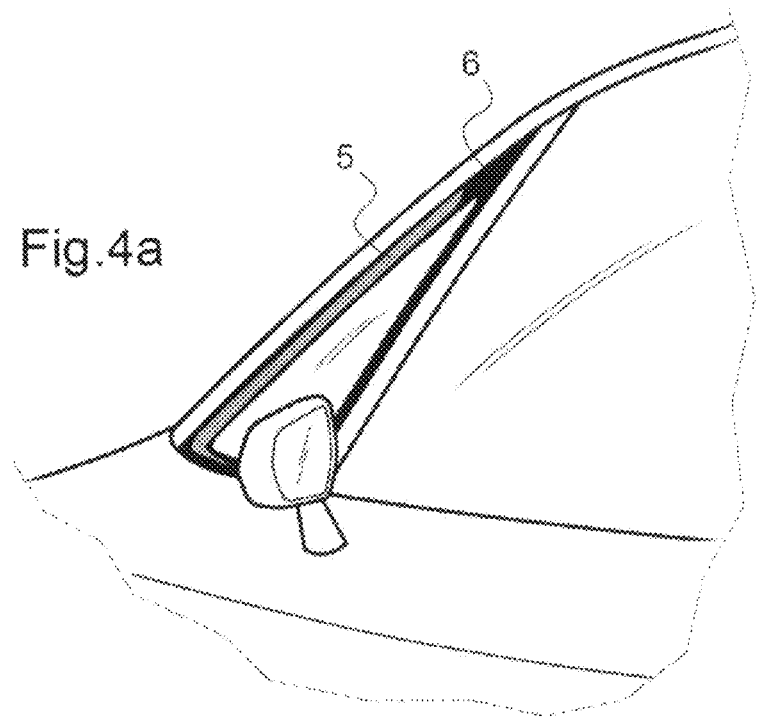
Figure 4B:
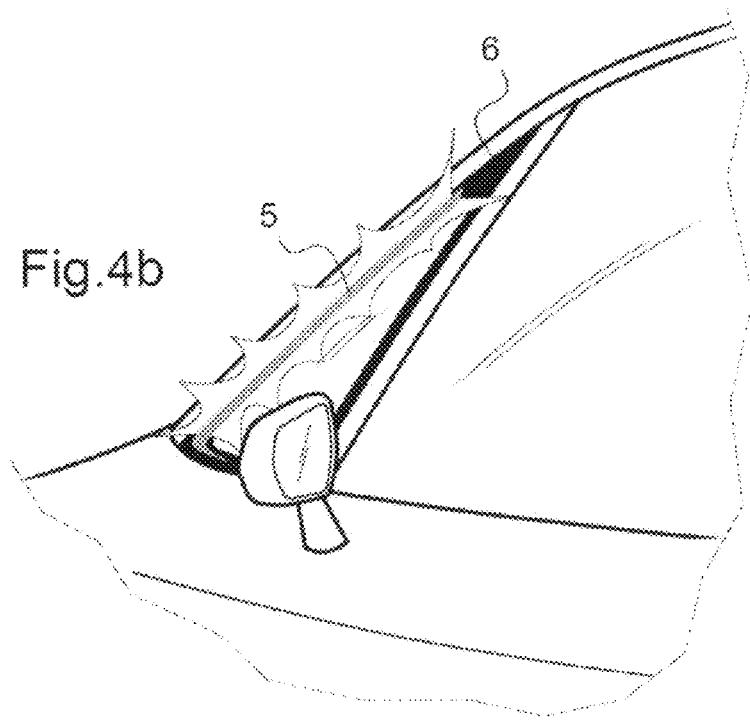

The present invention will now be described with reference to the appended figures in which FIG. 1 is a schematic cross-sectional representation of a first embodiment of a glazing unit according to the invention, FIG. 2 is a schematic cross-sectional representation of a second embodiment of a glazing unit according to the invention and FIG. 3 is a schematic cross-sectional representation of a third embodiment, and FIGS. 4a and 4b are illustrations of a fixed front side glazing unit playing the role of indicator light flasher.

More particularly, FIG. 1 shows the edge of a laminated glazing unit as a cross-sectional view. A second sheet 2, in contact via its first main surface 21 with the outside air, is bonded by means of a sheet separating interface 3 to a first sheet 1, illuminated by its edge face 13. The sheet separating interface is in adhesive contact with the second main face 22 of the second sheet and with the first main face 11 of the first sheet. The second main face 12 of the first sheet 1 is in contact with the inside air of the vehicle. A light-emitting diode (LED) 4 is positioned near to the edge face 13 of the first sheet 1, its emission face 41 being opposite this edge face. The means for extraction of the light 5 is here made up of two regions 5a, 5b etched into the surface of the first main face 11 of the first sheet 1. The opaque layer 6, an enamel applied onto the second main face 12 of the first sheet, has a much greater extent than the two etched regions 5a, 5b and covers an area which encompasses these two individual regions.

FIG. 2 shows the edge of a single-piece glazing unit according to the invention as a cross-sectional view. The glazing unit comprises a single sheet 1, called first sheet, with a first main face 11 in contact with the outside air, a second main face 12 in contact with the inside of the vehicle, and an edge face 13. The emission face 41 of a LED 4 is opposite the edge face 13. The means for extraction of the light 5 is in direct contact with the second main face 12 of the sheet 1. The extraction means 5 is covered, over its whole surface, by an opaque layer 6. The latter has exactly the same shape and size as the means for extraction of the light 5 and is superposed onto the latter without, however, overlapping its periphery.

FIG. 3 shows one embodiment where the means for extraction of the light 5 and the means for rendering opaque 6 are on two different sheets of a laminated glazing unit. The extraction means is situated on the second main face 12 of the first sheet 1, illuminated by the LED 4. The means for rendering opaque 6 is in contact with the first main face 21 of the second sheet 2 and also with the sheet separating interface 3. The opaque layer 6 may be formed from an enamel or from an opaque ink deposited onto the face 21, or else can be a layer of ink printed onto the sheet separating interface 3. As for FIG. 1, the spatial separation of the means for extraction of the light 5 from the opaque layer 6 justifies a larger size of the opaque layer 6 with respect to the extraction means 5.

FIGS. 4a and 4b illustrate an indicator light flasher, in the form of a fixed front side window of an automobile vehicle, in the off and on states, respectively. The light sources, not shown, are situated opposite the edge face of the window, positioned toward the front of the vehicle. The means for extraction of the light 5 is a single region with an elongated shape close to the light sources. A means for rendering opaque 6, with a greater extent than the extraction means, effectively prevents the light scattered by the extraction means from penetrating inside the vehicle.

The invention claimed is:

1. An automobile vehicle comprising:
    at least one side glazing unit capable of operating as a direction indicator light of the vehicle, the glazing unit comprising:
    a first transparent sheet, made of mineral or organic glass, including a first main face directed towards outside of the vehicle, a second main face directed towards inside of the vehicle, and an edge face;
    one or more light sources, each including a light-emission face opposite the edge face, light emitted by the light sources being guided into the first sheet between the first and the second main faces of the first sheet, the light sources being connected to allow emission of a flashing light, synchronized with flashing of other direction indicator lights of the vehicle;
    a diffusive coating in at least one region of the first main face or of the second main face of the first sheet or situated within a thickness of the first sheet, the diffusive coating emitting, when illuminated by the light sources, yellow light; and
    an opaque layer situated toward the inside of the vehicle with respect to the diffusive coating and totally masking the diffusive coating to render the diffusive coating invisible from the inside of the vehicle.

2. The vehicle as claimed in claim 1, wherein the opaque layer is in contact with at least one of the main faces of the sheet or of one of the sheets of the glazing unit.

3. The vehicle as claimed in claim 1, wherein the side glazing unit further comprises a second transparent sheet, made of mineral or organic glass, including a first main face directed toward the outside of the vehicle, and a second main face directed toward the inside of the vehicle, the second sheet being fixed to the first sheet by means of a transparent sheet separating interface in adhesive contact
    either with the second main face of the first sheet and the first main face of the second sheet, or
    with the first main face of the first sheet and the second main face of the second sheet.

4. The vehicle as claimed in claim 3, wherein the second sheet is fixed to the first sheet by the sheet separating interface which is in adhesive contact with the second face of the first sheet and the first main face of the second sheet, and the diffusive coating is on at least one of the main faces of the first sheet and the opaque layer is on at least one of the main faces of the second sheet.

5. The vehicle as claimed in claim 3, wherein the second sheet is fixed to the first sheet by the sheet separating interface which is in adhesive contact with the first main face of the first sheet and the second main face of the second sheet, and the diffusive coating is on the first main face of the first sheet and the opaque layer is on the second main face of the first sheet.

6. The vehicle as claimed in claim 3, wherein the opaque layer is on at least one of the main faces of the sheet separating interface.

7. The vehicle as claimed in claim 1, wherein the diffusive coating is on the second main face of the first sheet, and the opaque layer is directly in contact with the diffusive coating completely covering the diffusive coating, or going beyond the limits of the diffusive coating.

8. The vehicle as claimed in claim 1, wherein the diffusive coating is on the first main face of the first sheet and the opaque layer is on the second main face of the first sheet.

9. The vehicle as claimed in claim 1, wherein the diffusive coating is applied on plural regions of the first main face or of the second main face of the first sheet.

10. The vehicle as claimed in claim 1, wherein a total extent of a region or regions covered by the opaque layer is greater by at least 5% than a total extent of the region or the regions covered by diffusive coating.

11. The vehicle as claimed in claim 1, wherein the opaque layer covers a region which represents at most 80% of a total surface area of the glazing unit.

12. The vehicle as claimed in claim 1, further comprising a reflecting layer, or a metal layer, situated between the diffusive coating and the opaque layer.

13. The vehicle as claimed in claim 1, wherein the opaque layer is formed from enamel or ink and has an optical density in a range between 2.5 and 5.

14. The vehicle as claimed in claim 1, wherein the glazing unit is a fixed front side glazing unit.

15. The vehicle as claimed in claim 14, wherein emission faces of the light sources are opposite the edge face of the first sheet positioned toward a front of the vehicle.

* * * * *